United States Patent [19]

Frey et al.

[11] Patent Number: 5,982,783
[45] Date of Patent: Nov. 9, 1999

[54] SWITCH DISTRIBUTION VIA AN INTERMEDIARY SWITCHING NETWORK

[75] Inventors: Ernest J. Frey, Westminster; Norman W. Petty; Douglas A. Spencer, both of Boulder, all of Colo.

[73] Assignee: Lucent Technologies Inc., Murray Hill, N.J.

[21] Appl. No.: 08/876,458

[22] Filed: Jun. 16, 1997

[51] Int. Cl.⁶ .................................. H04J 3/16; H04J 3/22
[52] U.S. Cl. ........................... 370/467; 370/395; 370/410
[58] Field of Search .................................. 370/464, 465, 370/466, 467, 264, 395, 396, 397, 398, 399, 400, 409, 410, 524; 395/285, 835

[56] References Cited

U.S. PATENT DOCUMENTS

| | | |
|---|---|---|
| 3,550,906 | 8/1996 | Chau et al. . |
| 4,488,004 | 12/1984 | Bogart et al. . |
| 5,093,827 | 3/1992 | Franklin et al. . |
| 5,159,594 | 10/1992 | Bales et al. . |
| 5,182,750 | 1/1993 | Bales et al. . |
| 5,182,751 | 1/1993 | Bales et al. . |
| 5,185,742 | 2/1993 | Bales et al. . |
| 5,530,434 | 6/1996 | Kanda .................................. 340/825.04 |
| 5,550,984 | 8/1996 | Gelb ..................................... 395/200.17 |
| 5,732,213 | 3/1998 | Gessel et al. ......................... 395/200.11 |
| 5,784,371 | 7/1998 | Iwai ......................................... 370/397 |
| 5,818,921 | 10/1998 | Vander Meiden et al. .............. 379/225 |

OTHER PUBLICATIONS

J. Jainschigg et al., ATM is PHAT!, Teleconnect, vol. 15, Issue 2, Feb. 1997, pp. 90–94, 96, 98–100.
*Voice Networking over ATM with Magellan Passport,* Nortel Magellan, 1995 Northern Telecom Limited Pub. ref. 55015.25/11-95 Iss. 1, pp. 3–9.
B. Petri, et al., Narrowband ISDN and Broadband ISDN Service and Network Interworking, IEEE Communications Magazine, Jun. 1996, pp. 84–87, 82–83.

H. J. Fowler, et al., Network Management Considerations for Interworking ATM Networks with Non–ATM Services, IEEE Communications Magazine, Jun. 1996, pp. 102–106.

*Primary Examiner*—Ajit Patel
*Assistant Examiner*—Bob A. Phunkulh
*Attorney, Agent, or Firm*—David Volejnicek

[57] ABSTRACT

Port networks (PN 101–103) of a switching system such as a distributed PBX are remoted from and interconnected with each other by an ATM network (100). Each port network includes a port network connectivity (PNC) circuit (113–114) that interfaces it to the ATM network. Only one of the port networks (101) has a system processing element (SPE 111), which controls all of the port networks. Commands issued by the SPE and needed by the ATM network to establish virtual circuits between the port networks are translated (FIG. 2) by a PNC circuit (113) into ATM signaling cells. Commands issued by the SPE and not needed by the ATM network are encapsulated (FIGS. 2 and 3) as payload into ATM traffic cells by the PNC circuit and are sent to destination processor networks through the virtual circuits. At a destination processor network, the encapsulated commands are retrieved (FIGS. 2 and 3) and used for local control. The destination processor networks function as if they were connected directly to the SPE without intermediacy of the ATM network.

30 Claims, 7 Drawing Sheets

FIG. 1

FIG. 2
TDM CCMS

FIG. 3
PACKET D CHANNEL

FIG. 4
TDM TRAFFIC

SWITCH DISTRIBUTION VIA AN INTERMEDIARY SWITCHING NETWORK

TECHNICAL FIELD

This invention relates to telecommunications switching systems in general and to distributed switching systems in particular.

BACKGROUND OF THE INVENTION

As organizations grow and expand geographically, they desire their telecommunications systems to operate as a single, geographically dispersed, switching system with full feature transparency. U.S. Pat. No. 4,488,004 discloses providing such capability in a network of PBXs by equipping the PBXs with data controllers and transmitting feature-related data messages between individual PBXs' data controllers over data links that interconnect the PBXs in the network. This unfortunately requires that the PBXs be interconnected by a data network of the data links, in addition to the usual communications-carrying tie trunks. Furthermore, the data network follows a proprietary protocol, and therefore is not suited for being implemented via existing, open or public, data networks. U.S. Pat. No. 5,093,827 discloses providing the desired capability by interconnecting the PBXs via a proprietary center stage network (CSN). Since the CSN is proprietary, this unfortunately does not facilitate implementing of the desired capability via existing, open or public, networks. And U.S. Pat. No. 5,182,750 discloses a switching system architecture for interconnecting remote switching nodes to a central controller via standard ISDN links set up through intervening switching systems or the public switching network. It uses the same protocol to communicate between the switching nodes and the central controller as is used by the switching systems or switching network. Therefore, it also does not facilitate implementation of a feature-transparent distributed switching system that uses a proprietary protocol via an open or public network.

SUMMARY OF THE INVENTION

The foregoing disadvantages are solved and a technical advance is achieved by a method and an apparatus for controlling a first communications network by a second communications network that is connected to the first network by a third communications network. The first network uses a first communications protocol, the second network uses a second communications protocol that is either the same as or different from the first protocol, and the third network uses a third communications protocol that is different from the first and the second protocols. Illustratively, the first and the second networks are private-branch-exchange port networks respectively without and with a central controller that controls them both, and the third network is an asynchronous transfer mode (ATM) network. The second network issues first commands in the second protocol for controlling the first network, and issues second commands in the second protocol for controlling the third network. The second commands are translated at the second network from the second protocol into the third protocol, and the first commands are encapsulated at the second network in the third protocol. The translated second commands are sent to the third network which uses them to effect a communications connection between the first and the second networks. The encapsulated first commands are sent from the second network through the communications connection to the first network, which retrieves the first commands from the encapsulation and uses them to control the first network.

While the method comprises steps of the above-characterized procedure, the apparatus effects the method steps. The apparatus preferably includes an effector—any entity that effects the corresponding steps, unlike a means—for the steps. Furthermore, the apparatus alternatively comprises an effector, responsive to receipt from the second network via a communications connection extending through the third network between the first network and the second network of the first commands in the first or second protocol encapsulated in the third protocol, which retrieves the first commands from the encapsulation for use of the retrieved first commands by the first network in controlling itself.

The invention advantageously allows substantially any network—be it private or public—to interconnect the first and the second networks. Consequently, the first and the second networks can be located anywhere—even great distances and various intervening networks apart—as long as a suitable network interconnects them. The use of an existing public network as the third network means that new infrastructure is not needed to distribute the first and second networks. This drastically reduces the cost of network distribution, particularly when the distribution is on a global scale. At the same time, the first and second networks' architecture and functionality are not significantly affected by the intermediacy of the third network other than that interfaces must be constructed to properly interface the first and the second networks to the third network. But preferably the networks see the interfaces as just another type of port circuits. This means that the invention may be used to distribute legacy (existing) networks. Also, the existence of the third network is substantially transparent to the second network and especially to the first network: the first network functions as if it were connected directly to the second network without intermediacy of the third network. Feature transparency between the first and the second networks is thus preserved. Protocol conversion is done only on those commands that are needed by the third network to effect communications connections between the first and the second networks, and other commands are tunneled through the third network—encapsulated in the third protocol and sent as traffic through the communications connections. Hence, the third network need not have an understanding of the commands that it conveys between the first and the second networks—including feature-implementing commands—and therefore substantially any network can be used as the third network.

These and other advantages and features of the invention will become more apparent from the following description of an illustrative embodiment of the invention considered together with the drawing.

DETAILED DESCRIPTION

Figure 1:
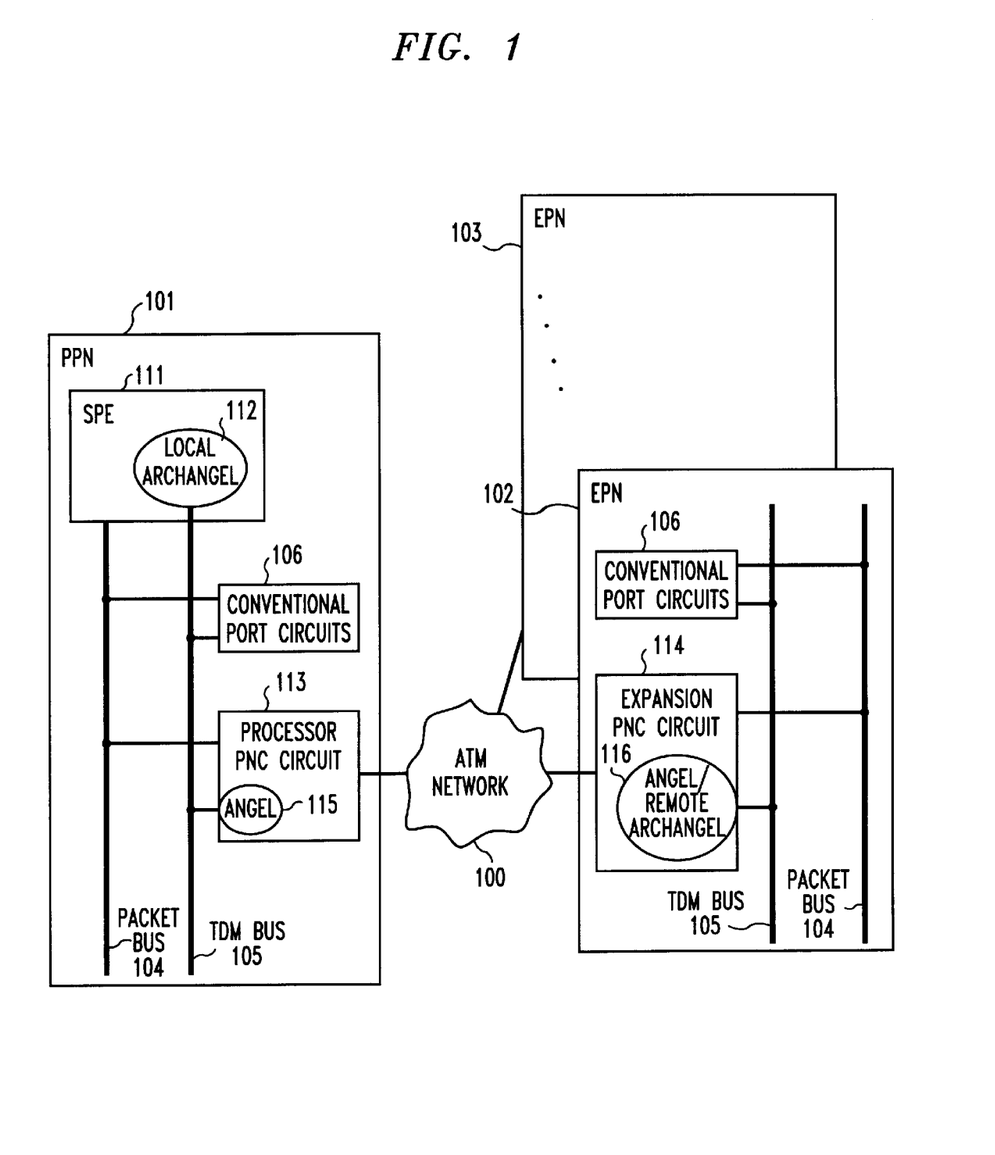
FIG. 1 is a block diagram of a distributed switching system which implements an illustrative embodiment of the invention.

FIG. 1 shows an illustrative switching system configured according to the invention. The switching system comprises a plurality of port networks 101–103 interconnected by an intermediary network 100. Each port network 101–103 is a switching node, such as a private branch exchange (PBX). Together, port networks 101–103 form a distributed switching system. One port network 101, designated as a processor port network (PPN), controls all port networks 101–103. The other port networks 102–103, designated as expansion port networks (EPNs), operate under control of PPN 101. In this illustrative embodiment, PPN 101 is a complete Lucent Definity® PBX including its system processing element (SPE) 111—a central controller comprising one or more processors,—while each EPN 102–103 is a Definity PBX without SPE 111. Intermediary network 100 in this illustrative embodiment is a packet-switching network, such as an Asynchronous Transfer Mode (ATM) cell-switching network comprising one or more ATM switches.

As is conventional, PPN 101 comprises a local area network (LAN) in the form of a packet bus 104, and a time-division multiplexed (TDM) bus 105, both connected to SPE 111. SPE 111 is interfaced to TDM bus 105 by a local "archangel" process 112. Archangel process 112 is a communications process that creates a common-control message signaling (CCMS) channel on the first five time slots of TDM bus 105 and interfaces control messages to the CCMS channel. Buses 104 and 105 are connected to conventional port circuits 106, which include telephone line and telephone trunk analog and/or digital port circuits. According to the invention, however, buses 104 and 105 are further connected to a processor port network connectivity (PNC) circuit 113 which interfaces buses 104 and 105 to ATM network 100. PNC circuit 113 executes, among others, an "angel" process 115. Angel process 115 substantially complements archangel process 112, the difference being that archangel process 112 functions as a master of the CCMS channel, whereas angel process 115 functions as a slave of the CCMS channel. To call-processing software of PPN 101, PNC circuit 113 looks like a multi-port primary-rate interface (ISDN PRI) trunk circuit and/or a Definity PBX expansion interface circuit.

Each EPN 102–103 substantially duplicates PPN 101 but lacks an SPE 111. Each EPN 102–103 includes an angel/remote archangel process 116 which complements the functionality of both processes 112 and 115, executes on an expansion PNC circuit 114, and receives control messages over ATM network 100 instead of directly from an SPE 111.

Functionally, PPN 101 operates as a conventional switch (e.g., a conventional PBX). But in addition to controlling port circuits 106, SPE 111 controls EPNs 102–103 as if they were port circuits of PPN 101. Correspondingly, EPNs 102–103 operate as conventional switches, except that they are each controlled by SPE 111 of PPN 101 acting through an expansion PNC circuit 114 via ATM network 100.

Feature transparency in the system of FIG. 1 is achieved through protocol conversion (translation) and protocol encapsulation (tunneling) effected by PNC circuits 113–114. Control information that is needed by ATM network 100 to effect connections between various port networks 101–103 is converted by PNC circuits 113–114 from CCMS message form into ATM signaling cell form and provided to ATM network 100. Control information that is only needed by port networks 101–103 and not by ATM network 100—including control information that is needed by EPNs 102–103 to complete the connections within PNC circuits 113114, and feature information—is wrapped, or encapsulated, by a PNC circuit 113114 into ATM traffic cells and is sent (tunneled) via virtual connections through ATM network 100 to destination port networks 101–103, where it is unwrapped, or retrieved, by PNC circuits 113–114. Also, communications traffic is sent between port networks 101–103 via virtual connections through ATM network 100 as ATM traffic cell payload.

Figure 2:
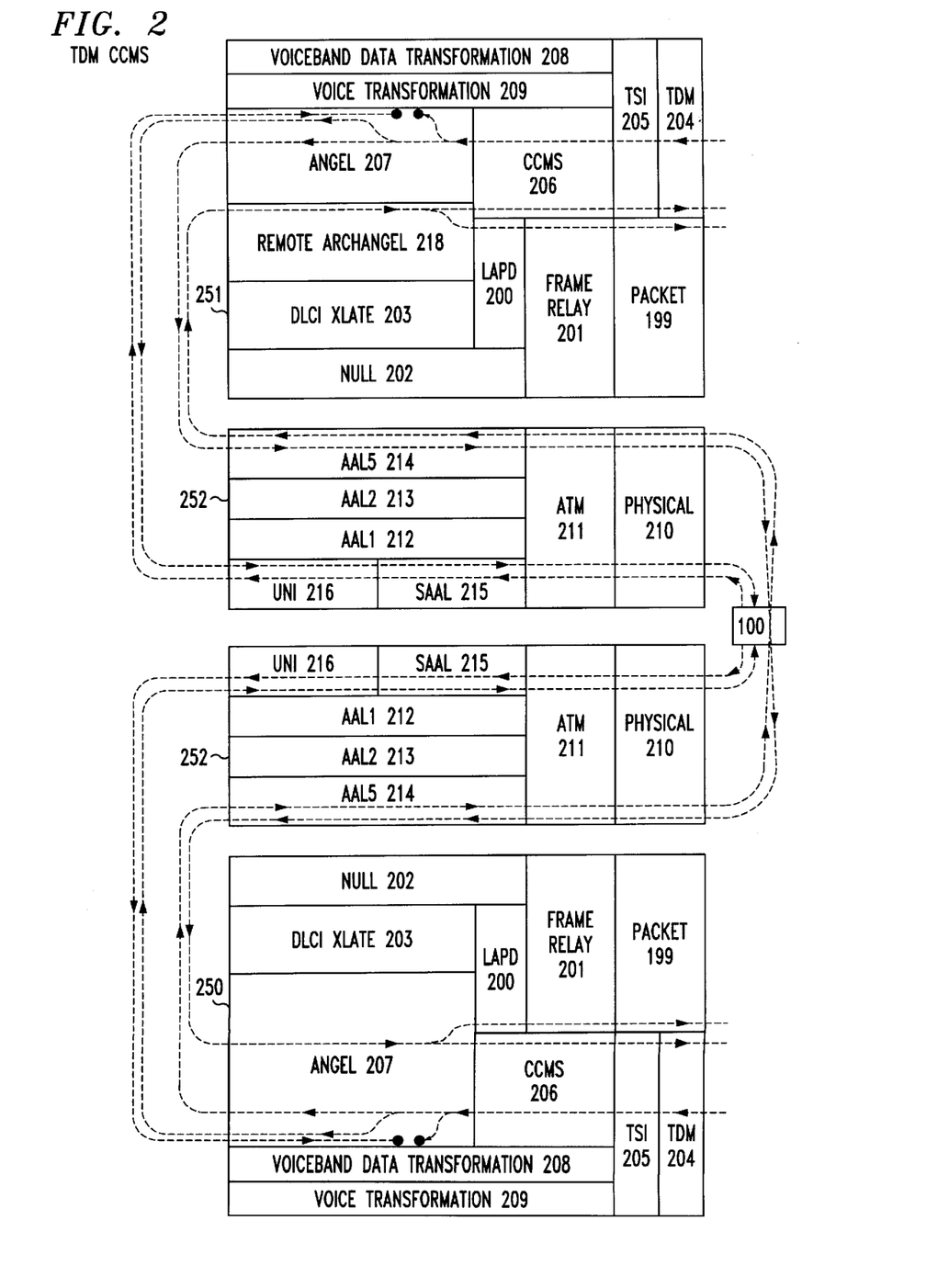
FIGS. 2–4 are block diagrams of protocol-layer processing of different types of information performed by port network connectivity circuits of port networks of the system of FIG. 1.
Figure 3:
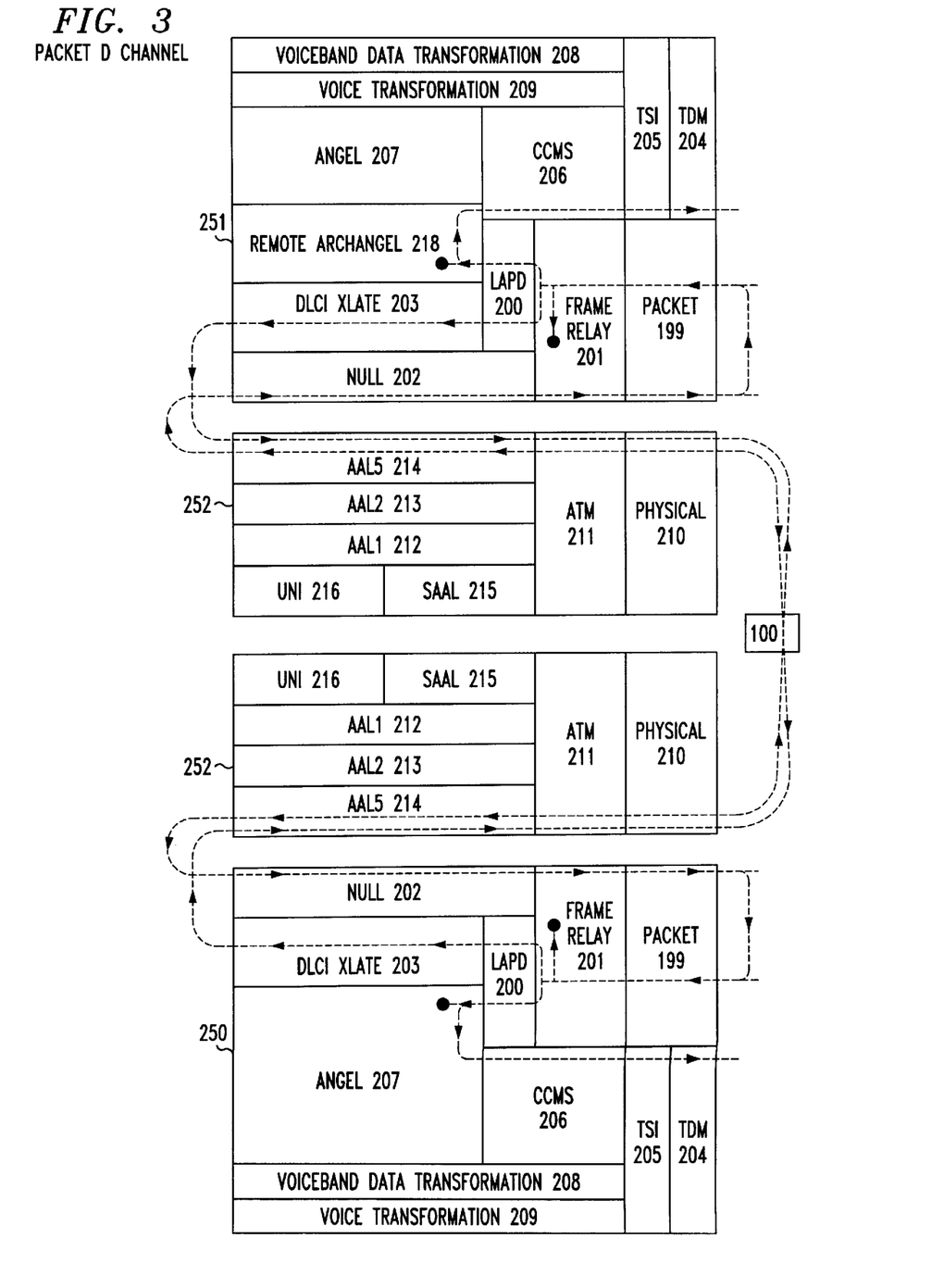
Figure 4:
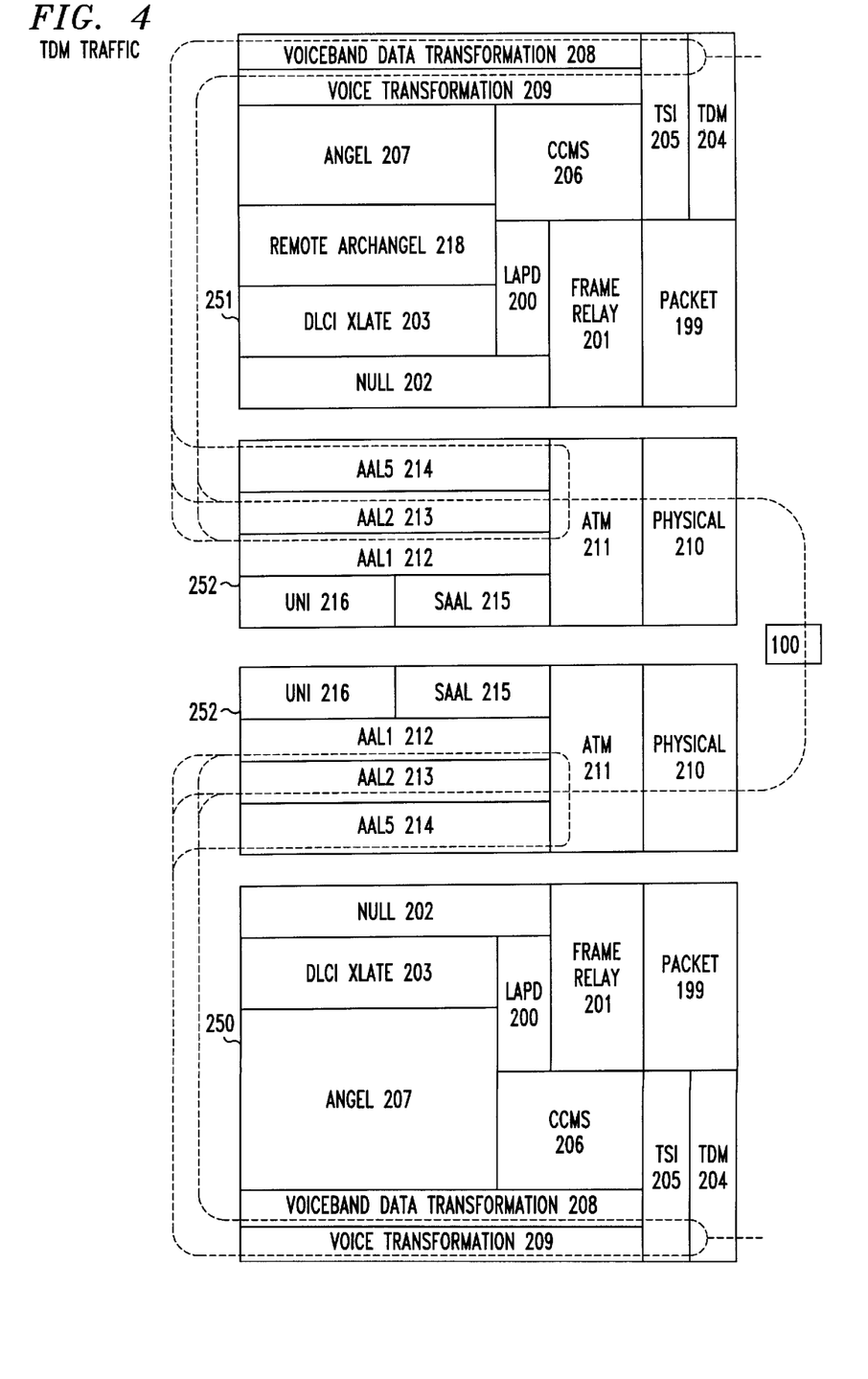

The protocol conversion and protocol encapsulation effected by PNC circuits 113–114 is illustrated in FIGS. 2–4, which show the PPN protocol stack 250, the EPN protocol stack 251, and the ATM protocol stacks 252 associated with each type and the transformations through those stacks effected by PNC circuits 113–114.

PPN protocol stack 250 comprises layers 199–209.

Packet layer 199 is the physical layer 1 of the ISO OSI model for packet bus 104. It transmits and receives packets in frame-relay form.

Link access protocol D (LAPD) layer 200 is the ISO OSI link layer 2 protocol for packet bus 104. It provides for the transfer of frames between higher-layer entities. It ensures data integrity during transport, computes full frames, and handles retransmissions.

Frame relay layer 201 provides conventional frame-relay services. It processes the frame-relay header information, in the conventional manner.

Null layer 202, as its name implies, is a transparent, no-operation, layer.

Data link control identifier (DLCI) translate (xlate) layer 203 performs DLCI translation and address-based routing. It uses board addresses and port numbers to determine whether packets need to be translated or encapsulated, remaps the DLCI of packets needing translation, and reroutes packets needing encapsulation to layer 214.

TDM layer 204 is the physical layer 1 of the ISO OSI model for TDM bus 105. It transmits and receives information in time-division multiplexed form.

Time-slot interchange (TSI) layer 205 performs conventional time-slot interchange switching functions for traffic of TDM bus 105.

CCMS layer 206 is the link layer 2 protocol for the CCMS channel of TDM bus 105.

Angel layer 207 is a packet layer 3 of the OSI model. It represents the processing effected by angel process 115. It interprets messages and determines whether they will be translated or tunneled, and uses them to effect connections of time slots, conversion, and local control.

Voiceband data transformation layer 208 processes non-voice traffic that is included in the traffic of TDM bus 105, such as H.320 data, HDLC data, PPP data, etc. In this illustrative embodiment, it is either a transparent, no-operation, layer that merely passes the data through, or a data-compression layer that removes flags and other extraneous information.

Voice transformation layer 209 performs voice processing functions—such as echo cancellation, silence removal and insertion, speech compression, conferencing, and call classification (detection of voiceband data or facsimile for disabling echo cancellation and/or speech compression)—for traffic of TDM bus 105.

EPN protocol stack 251 comprises the layers 199–209 of PPN stack 250 plus layer 218.

Remote archangel layer 218 represents the archangel processing effected by angel/remote archangel process 116, while its companion angel layer 207 represents the angel processing effected by angel/remote archangel process 116.

ATM protocol stacks 252 are identical. Each comprises layers 210–216. The ATM protocol and its layers are described, for example, in W. J. Goralski, *Introduction to ATM Networking*, McGraw-Hill, Inc. (1995). The following is a brief description of portions of the ATM protocol to aid the understanding of the illustrative embodiment of the invention.

Physical layer 210 performs all physical media-dependent functions. It generates the proper line coding to represent the physical bits in a manner that will be understood by the receiver, and is responsible for bit transmission, timing, and alignment. It also performs the tasks needed to properly load ATM cells into physical transport transmission frames on the sending side and remove them at the receiving side. These tasks are transmission frame generation/recovery, transmission frame adaptation, cell delineation, header error control (HEC) sequence generation/verification, and cell rate decoupling.

ATM layer 211 processes a stream of ATM cells. The layer is responsible for cell multiplexing/demultiplexing based on connection number (VPI/VCI), cell virtual path identifier (VPI)/virtual channel identifier (VCI) pair translation to the proper VPI/VCI pair for the output link, cell header generation/extraction and interpretation, and generic flow control for media access on the user network interface side of the network. This layer processes the cells that are received and transmitted by the physical layer. It examines the cell header to decide what should be done with the cells. It differentiates between network management cells, signaling cells, traffic cells, and "idle" cells (used for cell rate decoupling). The cell headers are not available for inspection at higher levels, so all functions involving the cell headers are done at this layer.

ATM adaptation layers (AALs) 212–215 provide the user interface to the ATM protocol stack. They are responsible for segmentation/reassembly and convergence. Segmentation/reassembly breaks down frames or packets or other higher-level data units into ATM cell payloads at the sender, and builds them up again at the receiver. Convergence allows higher layers to support the options of various (lower) layers while presenting a uniform interface to other (higher) adjacent layers. Convergence makes sure that the cell stream which is set up and sent is capable of providing the needed service to the application. Convergence provides the mechanism for mixing the different requirements of voice, video, and data by defining a number of classes of service, each with the appropriate parameters for the service. The services are: constant bit rate (CBR), variable bit rate-real time (VBR-RT), variable bit rate-non-real time (VBR-NRT), available bit rate (ABR), and unspecified bit rate (UBR). The AAL layers further operate on complete AAL frames to provide header and trailer record control to ensure the integrity of delivered information.

ATM adaptation layer 1 (AAL1) 212 supports constant bit-rate traffic. It is typically used for carrying conventional telephony traffic (existing E1 and T1 circuits), although PCM voice can be put directly on without the framing package. To deliver these services, AAL1 layer 212 performs functions including segmentation and reassembly, handling cell-delay variation, handling lost and misinserted cells, and handling bit errors.

AAL 2 layer 213 is used for connection-oriented, variable bit-rate, timing-sensitive applications, such as video and audio (or even voice) using compression techniques. Also known as the "composite user" layer, it allows multiplexing of multiple streams of information into a single virtual circuit and vice versa.

ATM adaptation layer 5 (AAL5) 214, also known as the simple and efficient adaptation layer (SEAL), supports variable-bit rate, connection-oriented, time-insensitive traffic, including most control traffic.

Signaling ATM adaptation layer (SAAL) 215 is a service-specific layer that is responsible for ensured delivery of signaling.

User network interface (UNI) layer 216 dynamically creates and releases virtual circuit connections (VCCs) between port networks 101–103 through the ATM network. It is synonymous with Q.2931 (broadband ISDN) signaling.

FIG. 2 shows the processing of information carried by the CCMS channel of TDM bus 105. Various control information, including all control information which ATM network 100 needs to establish and release switched virtual connections (SVCs) between port networks 101–103, is conveyed by SPE 111 to processor PNC circuit 113 as packets across the CCMS channel of TDM bus 103. Processor PNC circuit 113 processes the control information up PPN protocol stack 250 and down ATM protocol stack 252.

The CCMS packet is received by processor PNC circuit 113 as five-byte time slots at TDM layer 204. The five-byte chunks are forwarded through TSI layer 205 to CCMS layer 206, where they are reassembled into the packet. The packet is then forwarded to angel layer 207. From the packet content, angel layer 207 determines the packet's destination. If the packet is destined for the local PNC circuit 113, angel layer 207 terminates it (uses it up locally). If the packet is destined for a remote archangel, angel layer 207 forwards it to AAL5 layer 214 of ATM stack 252 for encapsulation and tunneling. If the packet contains virtual connection-related information, angel layer 207 sends it to UNI layer 216 for translation into ATM signaling cells.

At UNI layer 214, the information content of the packet is used to create ATM signaling cells that will control ATM network 100 and cause it to create or release a virtual circuit connection (VCC) through ATM network 100. A new VCC is typically created at the beginning of each new call and released at the end of the call. However, it is also possible to reuse VCCs for multiple sequential calls between the same port networks and thus avoid the overhead of VCC set-up/tear down. The ATM signaling cells are then sent to SAAL layer 215 which will ensure their delivery to ATM network 100. The signaling cells are handed over to ATM layer 211, where ATM cell headers are added to form complete ATM signaling cells. These are then transmitted at physical layer 210 into ATM network 100, where they are terminated and used in a conventional manner to create or release virtual circuit connections (VCCs) between two or more port networks 101–103.

When ATM network 100 establishes a connection to an EPN 102–103, CCMS packets which serve to establish the remote end of the end-to-end connection within that EPN 102–103 are tunneled through the ATM network connection to the EPN 102–103. The ATM cells bearing these CCMS packets are received by the EPN's expansion PNC circuit 114 at physical layer 210 and processed up ATM protocol stack 252 and down EPN stack 251. At ATM layer 211 the cells are stripped of their headers and forwarded to SAAL layer 215 where their delivery is confirmed. They are then forwarded to UNI layer 216 where their information content is used to create a CCMS packet that will control EPN 102–103 and cause it to create or release a corresponding internal connection. That packet is sent to angel layer 207 of EPN stack 251, which terminates the packet. Once the internal connection is established, a correspondence between it and the VCC is established by call processing using either out-of-band signaling (ATM endpoint selector identifier (ESI) addressing) or in-band signaling (initial control information transmitted on the VCC before traffic payloads are sent).

Returning to AAL5 layer 214, a packet destined for a remote archangel is segmented and processed here for use as ATM cell payloads. The payloads are forwarded to ATM layer 211 where ATM cell headers are added to form ATM traffic cells, thereby encapsulating the packets in the ATM protocol. The ATM traffic cells are then tunneled through ATM network 100 to their destination EPN 102–103 by being transmitted at physical layer 210 into ATM network 100 on the corresponding VCC.

The ATM traffic cells carrying a packet destined for a remote archangel are received from ATM network 100 at a destination EPN 102–103. The EPN's expansion PNC circuit 114 processes the cells up ATM protocol stack 252 to strip them of ATM headers and reassemble them into a packet, thereby retrieving the packet from its encapsulation in the ATM protocol. That packet is sent to remote archangel layer 218. From the packet content, remote archangel layer 218 determines the packet's destination, and feeds this information along with the packet to CCMS layer 206. CCMS layer 206 segments the destination information and the packet itself into five-byte chunks and forwards these through TSI layer 205 to TDM layer 204 for transmission on the CCMS time slots of TDM bus 105.

The processing in the opposite direction is symmetrical. Control information is received on the CCMS channel of TDM bus 105 by expansion PNC circuit 114, at TDM layer 204, and the received chunks are reassembled into a packet by CCMS layer 206. Angel layer 207 then determines the packet's destination, terminates those destined for the local PNC circuit 114, sends those destined for a remote archangel to AAL5 layer 214 of ATM stack 252, and sends those containing connection-related information to UNI layer 216. ATM stack 252 encapsulates the archangel-bound packet into ATM traffic cells and transmits them through the ATM network 100 to their destination. ATM stack 252 translates the connection-related packets into ATM signaling cells and transmits them into ATM network 100 where they are terminated. Any connection-related information that is required by a port network 101–103 at the far end of the connection is generated as CCMS packets and sent to that port network 101–103 via ATM network 100 in the form of ATM traffic cells.

At a destination EPN 102–103, the ATM cells are processed as described above for cells received from PPN 101. At destination PPN 101, the ATM cells are converted back into CCMS packets in ATM stack 252, and sent to angel layer 207 of PPN stack 250. Angel layer 207 terminates packets that resulted from connection-related information, and forwards archangel-bound packets that resulted from ATM traffic cells either to CCMS layer 206 or to LAPD layer 200, based on the packet content. CCMS layer 206 segments the packet into five-byte chunks and forwards these through TSI layer 205 to TDM layer 204 for transmission on CCMS time slots of TDM bus 105 to local archangel 112. LAPD layer 200 adds to the packet header a DLCI identifying local archangel 112 and forwards the packet through frame relay layer 201 to packet layer 199 for transmission on packet bus 104 to local archangel 112.

FIG. 3 shows the processing of information carried by packet bus 104.

Control information that is only needed by an EPN 102–103 is conveyed by SPE 111 to processor PNC circuit 113 via packets on an ISDN channel of packet bus 104. Processor PNC circuit 113 processes the control information up PPN protocol stack 250 and down ATM protocol stack 252. A packet is received by processor PNC circuit 113 at packet layer 199. At frame relay layer 201, the board address (identifier), port number (identifier), and DLCI of the packet are examined to determine its destination. If the packet is not addressed to processor PNC circuit 113, it is discarded. If the packet is destined for a remote PNC circuit 114, a remote archangel, or a remote packet bus 104, it is forwarded to DLCI xlate layer 203; and if it is destined for local PNC circuit 113, it is forwarded to angel layer 207, where it is terminated. At DLCI xlate layer 203, the board address, port number, and the DLCI of the packet are mapped to a virtual circuit connection (VCC) and to a new board address, port number, and DLCI, by using the contents of a translation table.

From layers 203 and 204 the packets are sent to AAL5 layer 214 of ATM stack 252, for encapsulation in the ATM protocol. At layer 214, the packets are segmented and processed for use as ATM cell payloads. The payloads are forwarded to ATM layer 211 where ATM cell headers are added to form ATM traffic cells, and these are tunneled through ATM network 100 to their destination by being transmitted at physical layer 210 into ATM network 100 on the corresponding VCC.

The ATM traffic cells are received from ATM network 100 at a destination EPN 102–103. The EPN's expansion PNC circuit 114 processes the ATM traffic cells up ATM protocol stack 252 to strip them of ATM headers and reassemble them into a packet, thereby extracting them from their encapsulation, and then processes the packet through EPN protocol stack 251. In stack 251, the packet is sent through null layer 202 to packet layer 199 and transmitted out on packet bus 104. If the packet is destined for angel/remote archangel 116, it is immediately received back by packet layer 199, and frame relay layer 201 forwards it on to remote archangel layer 218, where it is terminated.

The processing in the opposite direction is symmetrical. Control information that is only needed by PPN 101 or another EPN 102–103 is transmitted as packets on packet bus 104, and processed by expansion PNC circuit 113 up EPN protocol stack 251 and down ATM protocol stack 252. Packet layer 199 receives the packet, and frame relay layer 201 either discards it if it is not addressed to expansion PNC circuit 113 or forwards it on to one of the layers 203, 204, and 218, based on its address. Remote archangel layer 218 terminates packets which are forwarded to it, while layer 203 performs its processing and sends the packets to AAL5 layer 214 of ATM stack 252 for encapsulation. In ATM stack 252, the packets are converted into ATM traffic cells, and are transmitted through ATM network 100 to their destinations.

At a destination EPN 102–103, the ATM traffic cells are processed as described above for cells received from PPN 101. At destination PPN 101, the ATM traffic cells are converted back into a packet in ATM stack 252. The packet is then sent to null layer 202 of PPN stack 250 for transmission through packet layer 199 on packet bus 104. If the packet is destined for angel 115, it is immediately received back by packet layer 119, and frame relay layer 201 forwards it on to angel layer 207. Angel layer 207 determines from the packet contents if the packet is destined for local PNC circuit 114 or for archangel 112. If the packet is destined for local PNC circuit 114, angel layer 207 terminates it. If the packet is destined for archangel 112, angel layer 207 sends it to CCMS layer 206, which turns it into a CCMS packet, sends the packet to TDM layer 204 via TSI layer 205, and causes TDM layer 204 to transmit the packet to archangel 112 via the CCMS channel of TDM bus 105.

FIG. 4 shows the processing of communications traffic carried by TDM bus 105.

Voice and data traffic for transmission to EPNs 102–103 is conveyed to processor PNC circuit 113 in one or more time slots of TDM bus 105. Processor PNC circuit 113 processes the traffic up PPN protocol stack 250 and down ATM protocol stack 252 to convert it into payloads of ATM traffic cells. The time slots are received at TDM layer 204 and forwarded through TSI layer 205 either to voice band data transformation layer 208 or voice transformation layer 209. The decision of which layer 208 or 209 to forward the time slots to is controlled by the call processing function of PPN 101. Layer 208 either passes the data through or compresses it, as dictated by call processing, and then forwards the data either to AAL1 layer 212 or AAL2 layer 213 of ATM stack 252, also as dictated by call processing. Layer 209 performs on the voice traffic whatever transformations are dictated by call processing, and then forwards the voice traffic either to AAL1 layer 212 or AAL2 layer 213 or AAL5 layer 214, as dictated by call processing. At each of the layers 212–214, the voice or data traffic stream is segmented for use as ATM traffic cell payloads. The payloads are forwarded to ATM layer 211 where ATM cell headers are added to form ATM traffic cells, and these are transmitted at physical layer 210 into ATM network 100 on a corresponding VCC.

The ATM traffic cells are received from ATM network 100 at a destination EPN 102–103. The EPN's expansion PNC circuit 114 processes the ATM traffic cells up ATM protocol stack 252 to strip them of ATM headers, and to reassemble them into a traffic stream at the same adaptation layer 212–214 at which the traffic stream had been segmented. The traffic is then transferred to either layer 208 or layer 209 of EPN stack 251 based upon whether it is voice traffic or data traffic. Data traffic is passed through by layer 208 through TSI layer 205 to TDM layer 204. Voice traffic is processed at layer 209 by whatever transformations are dictated by the call processing function of EPN 102–103, and the transformed traffic is forwarded through TSI layer 205 to TDM layer 204. TDM layer 204 transmits the voice and data traffic on time slots of TDM bus 105.

The processing in the opposite direction is symmetrical. Voice and data traffic for transmission to PPN 101 or to another EPN 102–103 is conveyed to expansion PNC circuit 114 in one or more time slots of TDM bus 105 and is received by expansion PNC circuit 113 at TDM layer 204. Expansion PNC circuit 113 processes voice traffic at layer 209 as dictated by call processing and sends it to one of the adaptation layers 212–214 of ATM stack 252 as dictated by call processing. It also transfers data traffic through layer 208 to one of the adaptation layers 212–213 as dictated by call processing. ATM stack 252 turns the traffic into ATM traffic cells and transmits these through ATM network 100 to their destination. At the destination, the traffic is extracted from ATM traffic cells in ATM stack 252, processed at transformation layers 208–209 of PPN stack 250 or EPN stack 251, and transmitted onto time slots of TDM bus 105 at TDM layer 204.

Figure 5:
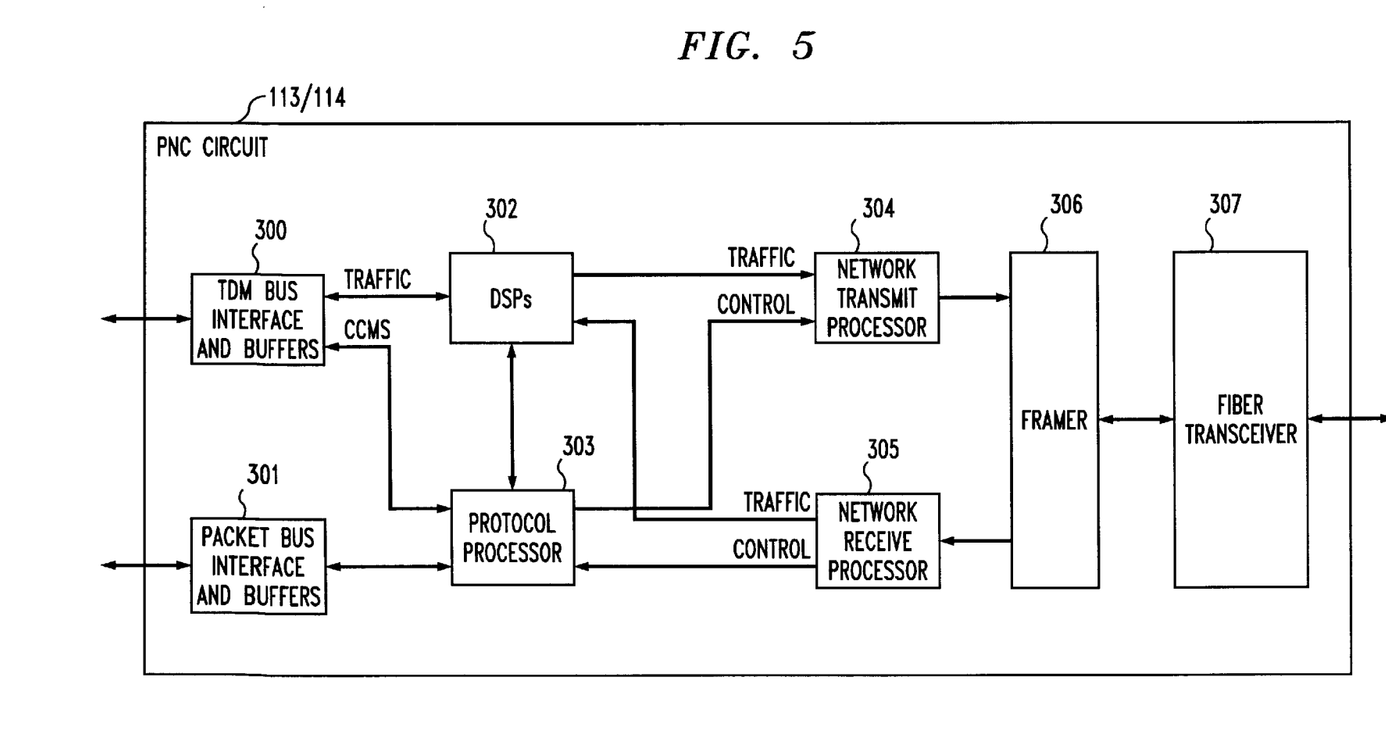
FIG. 5 is a block diagram of an illustrative port network connectivity circuit of the port networks of the system of FIG. 1.

The basic configuration of PNC circuits 113–114 is shown in FIG. 5. The architecture is a firmware-intensive design where firmware in twenty-seven processors (24 digital signal processors 302 plus processors 303–305) define the features and functions by means of which the above-described protocol conversion and encapsulation are effected. A PNC circuit 113 or 114 is coupled to TDM bus 105 via a TDM bus interface and buffers 300, to packet bus 104 via a packet bus interface and buffers 301, and is coupled to transmit and receive optical fibers which form an ATM link via a fiber transceiver 307.

A protocol processor 303 supports the PPN 101-to-EPN 103 control interface by processing uplink and downlink control channel (CCMS) and packet bus 104 messages. Protocol processor 303 has the following characteristics: real-time operating system, protocol processing, downloading of firmware to digital signal processors (DSPs) 302 and network processors 304 and 305, processing CCMS messages, processing and routing of packet bus 104 data and inter-processor network DLCI translation from packet bus 104, and management and maintenance of all PNC functions. Protocol processor 303 is also responsible for the ATM signaling, the protocol processing layer management, connection management, processing of ATM adaptation and higher layers, and for packet segmentation and reassembly.

A network transmit processor 304 has as its primary function the processing of the ATM layer (ATM header processing) and moving constant bit-rate and variable bit-rate data from digital signal processors (DSPs) 302 to a framer 306. Additionally, network transmit processor 304 provides the packet segmentation function for ATM traffic cells, transmits ATM signaling cells from protocol processor 303 to ATM network 100, and processes commands from protocol processor 303.

A network receive processor 305 has as its primary function the processing of the ATM layer (ATM header processing) and moving constant bit-rate and variable bit-rate date from framer 306 to DSPs 302. Additionally, network receive processor 305 provides the packet reassembly function for ATM traffic cells, transfers received ATM signaling cells from the ATM network to protocol processor 303, and processes commands from protocol processor 303.

Framer 306 provides a full-duplex interface with clock and data recovery to fiber transceiver 307. It provides synchronous optical network (SONET)/synchronous data hierarchy (SDH) processing and ATM mapping for ATM transmission convergence and physical media-dependent functions.

Twenty-four digital signal processors (DSPs) 302 interface to TDM bus 105 through TDM bus interface and buffers 300 such that any one of the 24 DSPs 302 can transmit onto and receive from any of the time slots of TDM bus 105. The DSPs 302 pack TDM time-slot data into ATM traffic cells, and then forward the cells to network transmit processor 304. In the reverse direction, the DSPs 302 receive ATM traffic cells from network receive processor 305 and unpack them into TDM time slots. Additionally, DSPs 302 perform processing of commands from protocol processor 303, time-slot interchange, linear-to-PCM (either A-law or $\mu$-law) conversion and vice versa, echo cancellation, compression/decompression, silence removal/insertion, call classification, conference and gain control, HDLC processing, DTMF tone generation, timing control (traffic shaping), and processing of ATM adaptation layers.

The twenty-seven processors 302–305 are interconnected through queues. In the transmit direction, DSPs 302 put ATM traffic cells into queues, and the network transmit processor 304 transfers the cells to framer 306. In the receive direction, the network receive processor 305 transfers ATM traffic cells from framer 306 to queues and DSPs 302 take the cells out of queues for processing. The queues also provide a command-and-response interface between protocol processor 303 and DSPs 302.

Flow of information through a PNC circuit 113 or 114 is as follows. ATM cells addressed to a PPN 101 or EPN 102–103 are received from ATM network 100 by fiber transceiver 307, converted from optical to electrical form, and forwarded to framer 306. Framer 306 does the physical layer processing to convert the ATM cells into a byte stream, which it feeds to network receive processor 305. Processor 305 does the ATM layer processing of the ATM cell header. It maps the ATM cell address to a particular destination in the PPN 101 or EPN 102–103, and also determines if the information carried by the ATM cell payload is control or user traffic. It sends user traffic through queues to DSPs 302 for processing, and sends control to protocol processor 303 for processing.

Protocol processor 303 translates control information received in ATM signaling cells into CCMS packets and forwards them either to process 115/116, or to TDM bus interface and buffers 300 for transmission on the CCMS control channel of TDM bus 105. Protocol processor 303 unwraps control information received in ATM traffic cells and forwards it either to TDM bus interface and buffers 300 for transmission on the CCMS control channel of TDM bus 105 or to packet bus interface and buffers 301 for transmission on packet bus 104.

DSPs 302 perform extraction of the user traffic from the ATM traffic cells received from network receive processor 305, and then perform processing and time-slot adaptation on the extracted user traffic by subdividing the cell payload stream into bytes and forwarding them to TDM bus interface and buffers 300 for transmission on TDM bus 105.

Flow of information in the other direction is as follows. Traffic time slots of TDM bus 105 that are assigned to a PNC circuit 113/114 are received by TDM bus interface and buffers 300 and forwarded to DSPs 302. Signaling and other control information on the CCMS control channel of TDM bus 105 which is addressed to a PNC circuit 113/114 is received by TDM bus interface and buffers 300 and forwarded to protocol processor 303. Similarly, packets on packet bus 104 that are addressed to a PNC circuit 113/114 are received by packet bus interface and buffers 301 and are forwarded to protocol processor 303.

DSPs 302 perform processing and ATM adaptation on the received time slots of data by encapsulating the time slots as payload in ATM traffic cells, and forwarding the ATM traffic cells to network transmit processor 304 through queues.

Protocol processor 303 converts the signaling received from TDM bus 105 into ATM signaling cells and forwards them to network transmit processor 304. Protocol processor 303 encapsulates other control information received from TDM bus 105 and packets received from packet bus 104 in the ATM protocol to create ATM traffic cells, and forwards these to network transmit processor 304.

Network transmit processor 304 converts destination information of the ATM cells which it receives from DSPs 302 and protocol processor 303 and converts it into ATM header information. It then sends the ATM cells' byte streams to framer 306, which does the physical layer processing to convert the byte stream into ATM cells. Framer 306 then forwards the ATM cells for transmission to fiber transceiver 307. Transceiver performs electrical to optical conversion on the ATM cells and transmits them to ATM network 100.

Most PBX voice paths and control paths are point-to-point; however, various multi-party (conference) and control scenarios require more complex call topologies. These fall into the categories of point-to-multipoint and multipoint-to-multipoint connections. Generally, this is visible to the endpoint and intermediate communications networks of the implementation of FIG. 1 when inter-processor network connections involving more than two processor networks are of interest.

An important capability of PNC circuits 113–114 is support for multi-party connections, either point-to-multipoint or multipoint-to-multipoint. This capability is provided regardless of the intermediate network's ability to support multi-party connections; this interface assumes the intermediate network supports nothing more than basic point-to-point connections.

When data is destinated for multiple port networks, a PNC circuit 113/114 replicates cells as needed, and transmits these cells over the correct connections (e.g., VCCs) to their respective destinations. For TDM traffic (voice or in-band data), cell replication is done in the DSPs and then sent out over multiple VCCs using the appropriate protocols for the data type being transmitted. For packet traffic, the cell replication is done in the protocol processor as it is sent to the network processors, and then through the appropriate connection (VCC). Alternatively, all cell replication could be done by the network transmit processor.

At a receiving port network, it is possible to merge the voice traffic (conference) either by using conferencing functions of the DEFINITY PBX port/trunk interfaces, or by using the DSPs on PNC circuit 113/114. In the first case, multiple TDM timeslots are used; one for each incoming connection. In the second case, only one TDM timeslot is used to carry the merged sources.

Figure 6:
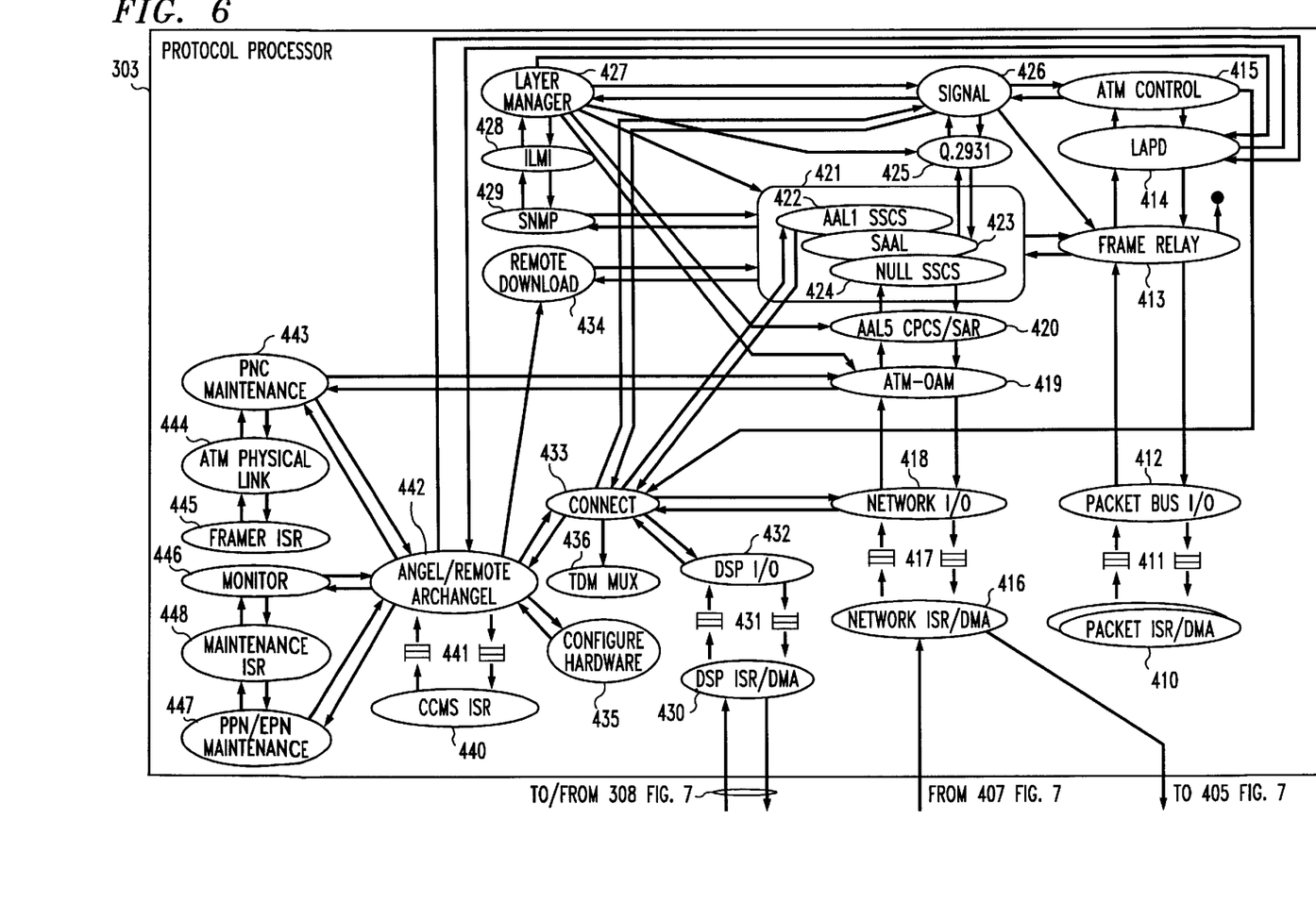
FIGS. 6–7 are a block diagram of the architecture of the firmware of the port network connectivity circuits of the port networks of the system of FIG. 1.
Figure 7:
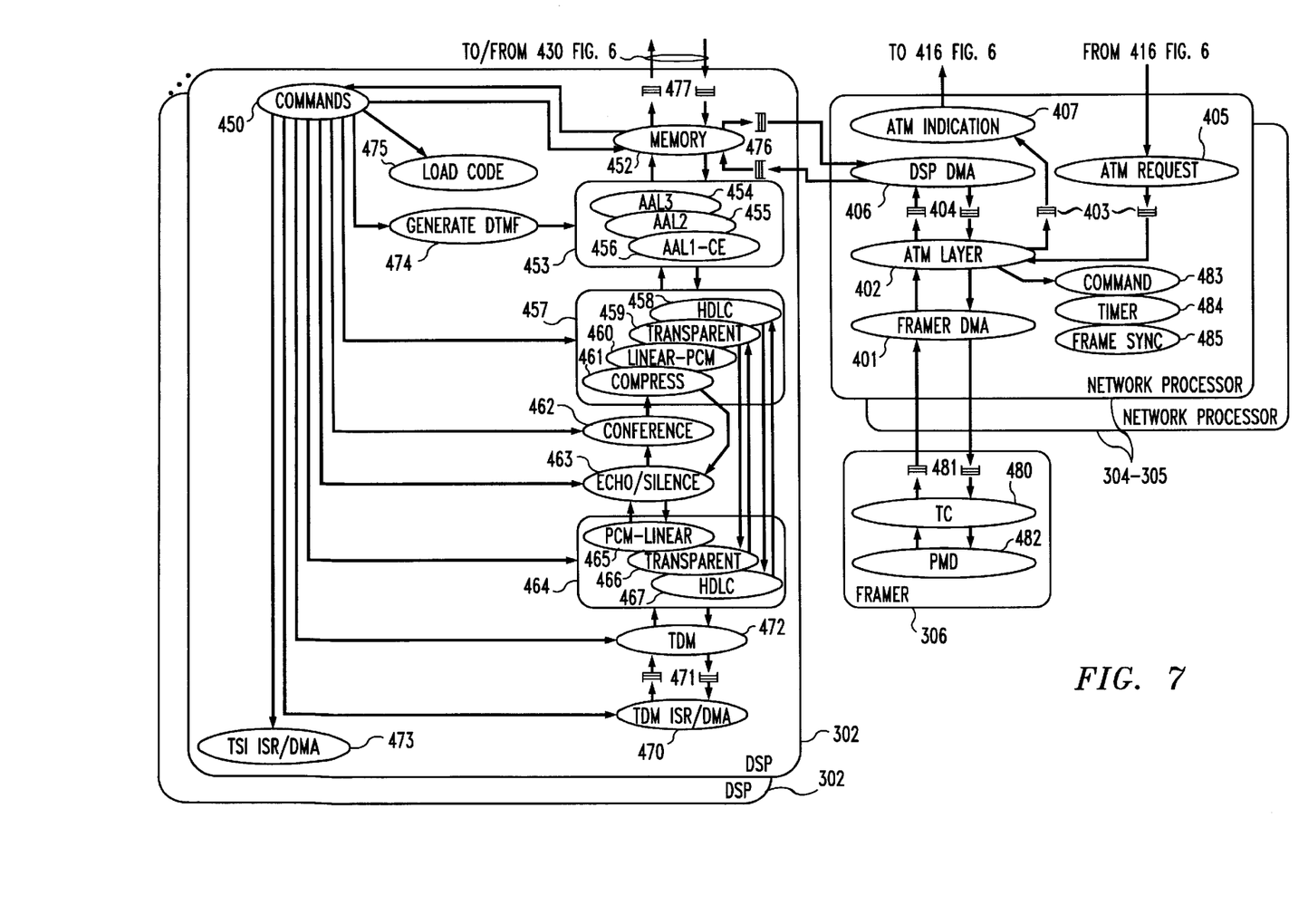

FIGS. 6–7 show the firmware architecture of PNCs 113/114. The firmware for each processor 302–304 is represented by rectangles surrounding ellipses, which represent the firmware function modules. The rectangle labeled framer 306 is included merely to show all of the ATM layers and queues. Rectangles with curved corners represent abstract classes (classes with no direct instances) and the overlapping ellipses within the rectangles with curved corners represent the specialized descendant classes. The open ladders represent queues. The ellipses marked ISR and DMA in the processor rectangles represent interrupt service routines (ISRs) and direct memory access (DMA) transfers between a processor and an input-and-output device of another processor. To minimize complexity, the figure does not show all maintenance interfaces with the maintenance subsections of each module.

Angel/remote archangel module 442 decodes and processes CCMS messages from TDM bus 105, and expansion archangel link (EAL; a logical connection between local archangel 112, angel 115, and an angel/remote archangel 116) messages and CCMS messages from packet bus 104, and generates and encodes messages in the opposite direction. It passes control to PPN/EPN maintenance module 447 for port network-wide maintenance functions, to PNC maintenance module 443 for PNC circuit 113/114 maintenance functions, to connect module 433 for functions that connect time slots, to remote download module 434 to start downloading to/of an EPN 102–103, and to configure hardware module 435 for hardware-related configuration. Module 442 communicates with SPE 111 through queues 441 and CCMS ISR module 440.

CCMS ISR module 440 provides a synchronous communications link for CCMS messages between angel/remote archangel module 442 and archangel 112. Module 440 is a finite-state machine that stores information received from the CCMS channel of TDM bus 105 in an input queue 441 and writes information retrieved from an output queue 441 to the CCMS channel.

PPN/EPN maintenance module 447 performs maintenance interface functions with maintenance circuitry of port network 101–103 through a maintenance ISR module 448.

Maintenance ISR module 448 processes maintenance circuitry interrupts and provides asynchronous communications for PPN/EPN maintenance module 447 and monitor module 446.

Monitor module 446 provides a general purpose debug and development interface.

PNC maintenance module 443 performs PNC-specific maintenance, including software-requested maintenance functions, ATM F4 and F5 maintenance flows, ATM physical link (fiber link) maintenance processing, and background maintenance functions.

ATM physical link module 444 monitors and processes exceptions associated with the fiber link, including Loss of Signal (LOS), Out of Frame (OOF), Loss of Frame (LOF), Line Alarm Indication Signal (AIS), Line Remote Defect Indication (RDI), Loss of Pointer (LOP), Path Signal Label Mismatch, Path Alarm Indication Signal (AIS), and Loss of Cell Delineation and Path (RDI). It also inserts the following fault flows onto the fiber link: Path Alarm Indication Signal (AIS), Path Remote Defect Indication (RDI), Line Alarm Indication Signal (AIS), and Line Remote Defect Indication (RDI).

Framer ISR module 445 processes interrupts from framer 306 and provides communication between ATM physical link module 444 and framer 306.

Configure hardware module 435 controls PNC circuit 113/114 hardware configuration registers in response to CCMS messages, and senses and reports the state of hardware status registers via CCMS messages.

Signal module 426 provides ATM control module 415 with the signaling interface for setting up and tearing down virtual circuits for both TDM bus 105 information and packet bus 104 information. Signal module 426 communicates with Q.2931 module 425 and maintains the call records of ATM VPI/VCI associations.

Connect module 433 requests signal module 426 to set up and tear down virtual circuit connections through ATM network 100, and commands network processors 304–305 to associate VPI/VCIs (obtained from signal module 426) with DSPs 302 and DSP-specific call references. Connect module 433 controls TDM mux module 436 and commands the DSPs: to set up the time-slot interchange for TDM bus 105 time slots; to enable or disable echo, conference, and compression; which AAL-layer process 454–456 to use; and which DSP-specific call reference to use to associate network processors' cell payloads in circular queues 477 with the selected time slots. Module 433 also manages all DSP 302 commands.

DSP ISR/DMA module 430 manages communication of commands, responses, and data between protocol processor 303 and DSPs 302. It moves information between DSP read and write queues 431 of protocol processor 303 and read and write circular queues 477 of DSPs 302 via direct-memory access (DMA) operations.

DSP input and output (I/O) module 432 manages DSP read and write queues 431.

Network ISR/DMA module 416 manages communication of commands, responses, and data between protocol processor 303 and network processors 304–305; communication procedures between processor 303 and both processors 304–305 are identical. Protocol processor 303 writes commands and data to memories of network processors 304–305 and reads data from memories of network processors 304–305. Protocol processor 303 generates new commands or data requests only if an ATM-request memory word in the network processor memory has been set by a network processor 304–305, and clears the ATM-request memory word when the command or data cell is written to a network processor 304–305. Protocol processor 303 reads cells from network receive processor 305 only if an ATM-indication memory word is set by receive processor 305, and clears the ATM-indication memory word when the data cell is read from network receive processor 305. A network processor 304–305 generates a protocol processor interrupt to inform protocol processor 303 that it has information to process. The information is moved between protocol processor 303 and network processors 304–305 via DMA.

Network I/O module 418 manages the network read and write queues 417.

ATM operations, administration, and maintenance (OAM) module 419 processes ATM OAM cell payloads and routes traffic (user-data) cell payloads to the upper ATM adaptation layer 5 (AAL5) for processing by protocol processor 303.

AAL5 common part convergence sublayer (CPCS)/segmentation and reassembly sublayer (SAR) module 420 is used for UNI signaling and data transport. It converts between AAL frames and ATM cell payload information, and operates on complete AAL frames to provide header and trailer record control to ensure integrity of delivered information.

The firmware implementing the service-specific convergence sublayer of ATM adaptation layers is represented in FIG. 6 as an abstract class 421 with multiple specialized descendant classes 422–424. Each AAL consists of one of the classes 422–424 plus AAL5 CPCS/SAR module 420.

Null service-specific convergence sublayer (SSCS) module 422 provides AAL5 SSCS interface to services, such as data, that do not require SSCS services.

SAAL module 423 provides that SSCS part of the AAL5 protocol which is responsible for signaling. It communicates directly with Q.2931 module 425.

AAL1 SSCS module 422 is the SSCS for circuit emulation under ATM adaptation layer for transporting multiple TDM bus time-slots and a data control channel (packet bus D-channel) over a single ATM VPI/VCI. It provides the D-channel (data) interface to DSP ISR/DMA module 430 for DSPs 302 which perform the circuit emulation (and AAL2 composite user) processing.

Q.2931 module 425 provides broadband ISDN (BISDN) signaling. It supports the following functions: Call/Connection Set-up, Call/Connection Request, Call/Connection Answer, Call/Connection Clearing, Reason for Clearing, and Out-of-Band Signaling.

Layer manager module 427 manages the inter-protocol connections and the sequencing of protocols as they start. It also connects to interim local management interface (ILMI) module 428 for network management.

Interim local management interface (ILMI) module 428 provides configuration, performance, and fault management of virtual circuit connections, performing negotiations as to what addresses are used on each end of a connection. It operates over AAL5 and connects to an SNMP module 429 for message transport.

Simple network management protocol (SNMP) module 429 implements the standard SNMP. It is used to carry ILMI information to/from the other end of a VCC.

Packet ISR/DMA module 410 controls the packet bus interface and buffers 301 and services interrupts therefrom. A read interrupt service routine polls a read interrupt latch and when the latch is set, enqueues an incoming packet from packet bus 104 on a packet read queue 411 and sets up an internal DMA controller of protocol processor 303 for the next frame. A write interrupt service routine dequeues a packet from a packet write queue 411, sets a write interrupt latch, and sets up the DMA controller to write the frame, and transmits the dequeued packet on packet bus 104.

Packet bus I/O module 412 manages the packet read and write queues 411.

Frame relay module 413 discards packets not destined for this PNC circuit 113/114, and routes packets destined for this PNC circuit 113/114 from packet bus I/O module 412 to either LAPD module 413 or AAL SSCS module 422, based on the board address, port number, and DLCI. Frame relay module 413 also performs DLCI translation for transmitted ATM packets and connects the ATM packets to either null SSCS module 424 or AAL1 SSCS module 422. Frame relay module 413 further performs DLCI translation for received and transmitted LAPD packets. Frame relay module 431 maintains a translation table that associates the translated DLCI with the VPI/VCI (obtained from signal module 426). Frame relay module 413 generates the cyclic redundancy code (CRC) for packets from LAPD module 414 and checks the CRC of packets to LAPD module 414.

LAPD module 414 implements the link-layer protocol of ISDN. Depending on the DLCI, it connects a packet to either ATM control module 415 or archangel module 442.

ATM control module 415 processes the ATM control link (ACL) messages. It associates a VPI/VCI with a call reference, and connects a packet either to signal module 426 for signaling control or to connect module 433 for connection and DSP service control.

Remote download module 434 effects downloading of firmware from processor PNC circuit 113 to expansion PNC circuits 114. It connects to null SSCS module 424 for remote downloads of an expansion PNC circuit 114 over the ATM network. Module 434 of processor PNC circuit 113 downloads an image of the firmware over ATM network 100 to an expansion PNC circuit 114. It retransmits the image if it receives a negative acknowledgement. Module 434 of expansion PNC circuit 114 receives the image over the ATM network, validates the image integrity using a CRC check, discards a bad image and generates a negative acknowledgement, or programs a good image into memory of protocol processor 303 and generates a good acknowledgment, and then reboots the PNC circuit.

ATM indication module 407 manages communication of data cells from network receive processor 305 to protocol processor 303. It processes new data only if the ATM-indication memory word is cleared. It then sets the ATM-indication memory word to point to the next cell in queue 403 that is available for transfer and generates an interrupt to protocol processor 303 to inform protocol processor 303 that it has information to process.

ATM request module 405 manages communication of commands and data cells from protocol processor 303 to the subject network processor 304/305. It processes new commands or data only if the ATM-request memory word is cleared. It then sets the ATM-request memory word to point to the next cell in queue 403 that is available for transfer and generates an interrupt to protocol processor 303 to inform protocol processor 303 that it has information to process.

DSP DMA module 406 controls an internal DMA controller of the subject network processor 304/305 for the interface with DSPs 302, and transfers ATM payloads between read and write circular queues 476 in DSPs 302 and DSP queues 404 in network processor 304/305.

ATM layer module 402 processes the header for each ATM cell and manages the virtual connections (VPI/VCIs). Module 405 of network receive processor 305 uses the VPI/VCI to associate a virtual circuit connection (VCC) with an ATM connection structure. It uses the ATM connection structure to route the ATM cell to DSP queue 404 for constant bit-rate and real-time variable bit-rate information, or to protocol queue 403 for packet information or constant bit-rate ATM operations and maintenance (OAM) cells.

Module 405 of network transmit processor 304 gets a bit-rate payload from DSP queue 404 if queue 404 is not empty, and gets a packet payload from protocol queue 403 if queue 404 is empty. It then uses the reference from the payload as an index to an ATM connection structure to associate a VPI/VCI with the payload, attaches the ATM header, and passes the ATM cell structure to framer DMA module 401.

Framer DMA module 401 controls the internal DMA controller of the subject network processor 304/305. It is the highest-priority task and runs whenever receive queue 480 of framer 306 is not empty or transmit queue 480 of framer 306 is not full.

Command module 483 processes commands received via ATM layer module 402 from protocol processor 303. These commands effect establishment and removal of associations between VPI/VCIs and calls. They are encoded as cells and are received by ATM layer module 402 through the same queue 403 as data.

Timer module 484 limits the rate (traffic shaping) at which network transmit processor 304 sends data to framer 306 to a rate below a predetermined threshold.

Frame sync module 485 starts polling of DSP circular queues 476 on network transmit processor 304. It is called every 125 microseconds.

Transmission convergence (TC) module 481 of framer 306 performs ATM header error code (HEC) generation/verification, cell scrambling/descrambling, HEC cell delineation, SONET/SDH C2 byte path signal identification, frequency justification/pointer processing, multiplexing, scrambling/descrambling, and transmission frame generation/recovery.

Physical media dependent (PMD) module 482 of framer 306 performs bit coding and line coding for the physical medium (optical fiber) of the ATM link.

Memory limitations of DSPs 302 prevent all DSP firmware from residing on each DSP 302. Each DSP 302 therefore contains a functional subset of the complete DSP firmware, supplied by load code module 475. Load code module 475 is a shared memory code loader that is started in response to commands issued by protocol processor 303. Protocol processor 303 loads the write queue of circular queues 477 with the operational code to configure or reconfigure the subject DSP 302 and issues a command to module 475 that specifies the execution starting address. Module 475 loads the memory of DSP 302 from the write queue of circular queues 477 and starts execution at the specified address.

Commands module 450 processes commands generated by protocol processor 303 and generates appropriate responses. Protocol processor 303 communicates commands, responses, and data to and from DSPs 302 via circular queues 477 in DSPs 302.

TSI ISR/DMA module 473 manages the DSP's internal hardware interfaces, maintains a time slot interchange (TSI) bit field, and initializes the DSP's internal DMA controller and transmitters for each frame, so that each DSP 302 can perform its own TSI functions. Module 473 receives configuration information from commands module 450.

TDM ISR/DMA module 470 manages the DSP's interfaces to TDM bus interface and buffers 300, maintains DMA read and write buffer queues, and initializes the DSP's internal DMA controllers. Module 470 receives configuration information from commands module 450.

TDM DMA buffer queues 471 maintain TDM information used by the subject DSP 302 in time-slot order. TDM module 472 manages what DSP transformations are applied for each TDM information element. If no DSP transformations apply to a TDM information element, the TDM information element passes through transparent module 466, which provides transparent operation (no transformations) for information elements. HDLC data information elements pass through HDLC module 467 for bit stuffing/unstuffing and flag insertion/removal. Information elements that require echo cancellation, silence removal, conference, or compression pass through PCM-linear module 465 where linear-to-PCM ($\mu$-Law or A-Law) and PCM-to-linear conversions take place.

Echo/silence module 463 performs near-end echo cancellation, and performs near-end and far-end silence detection to disable updating of echo cancellation coefficients during far-end silence and during double-talk conditions. The detected silence signals are removed during variable bit-rate voice compression. The echo cancellation switches to echo suppression during periods of both near-end and far-end silence, and generates silence. The echo cancellation also listens for the 2100 Hz call-classification tone sent by fax and modem devices to turn off echo cancellation and compression.

Conference module 462 provides conference and gain control services for multiple outgoing time slots.

Compress module 461 performs adaptive differential pulse code modulation (ADPCM) compression, and linear-to-ADPCM and ADPCM-to-linear conversions.

Linear-PCM module 460 performs PCM-to-linear and linear-to-PCM conversions on information elements that require echo cancellation, silence removal, or conference, but not compression.

Generate DTMF module 474 generates DTMF tones when commanded by commands module 450.

Memory module 452 manages circular queues 476 and 477. It packs and unpacks bits for proper-size transfers through queues 476 and 477.

Abstract class 453 containing modules 454–456 performs the ATM adaptation layer processing on the cell payloads. The cell payloads are queued, which allows a DSP 302 to fill one cell while network transmit processor 304 transmits the other, and network receive processor 305 to receive a cell while DSP 302 plays out the other.

AAL1-CE module 456 supports synchronous networking of constant bit-rate connections. It also provides structured cell emulation (CE), carrying multiple 64 kbps (DS0) channels per cell to emulate ISDN primary rate T1/E1 circuits. It includes a sequence number in each cell and a structured emulation pointer in every other cell, and delivers 46 or 47 bytes of PCM encoded traffic in the cell payload. It also receives/provides ISDN D-channel information from/to protocol processor 303 in packets of up to 260 bytes long. Module 456 computes and inserts HDLC framing to D-channel information and inserts the HDLC-framed information into the circuit emulation stream. In the other direction, module 456 extracts HDLC framing from the D-channel information in the circuit emulation stream.

AAL2 module 455 processes variable-length composite payloads and combines them with ISDN D-channel information in the same manner as module 456.

AAL5 module 454 provides a general adaptation layer for transport of all types of information. It includes a 4-byte CRC error-correction code with the 44 bytes of PCM-coded traffic that it delivers in the cell payload.

Of course, various changes and modifications to the illustrative embodiment described above will be apparent to those skilled in the art. For example other types of voice or data processing, call classification techniques, ATM adaptation layers, and end-network and intermediate-network signaling protocols and addressing schemes may be used. Also, in addition to point-to-point connections, broadcast (1-to-N) connections and multi-party calls (N-to-M) connections may be established. Such changes and modifications can be made without departing from the spirit and the scope of the invention and without diminishing its attendant advantages. It is therefore intended that such changes and modifications be covered by the following claims.

The invention claimed is:

1. A method of controlling a first communications network that uses a first communications protocol from a second communications network that uses a second communications protocol and that is connected to the first network by a third communications network that uses a third communications protocol different from the first and the second protocols, comprising the steps of:

issuing first commands in the second protocol for controlling the first network and second commands in the second protocol for controlling the third network, at the second network;

translating the second commands from the second protocol into the third protocol, at the second network;

encapsulating the first commands in the third protocol, at the second network;

sending the translated second commands to the third network for use in effecting a communications connection between the first and the second networks;

sending the encapsulated first commands from the second network through the communications connection to the first network for receipt of the encapsulated first commands by the first network, retrieval of the first commands from the encapsulation at the first network, and use of the retrieved first commands in the first network to control the first network.

2. The method of claim 1 further comprising the steps of:

using the translated second commands in the third network to effect a communications connection between the first and the second networks;

transporting the encapsulated first commands from the second network through the communications connection to the first network;

retrieving the first commands from the encapsulation at the first network; and using the retrieved first commands in the first network to control the first network.

3. The method of claim 2 whereby:

the first network functions as if it were connected directly to the second network without intermediacy of the third network.

4. The method of claim 1 wherein:

the first protocol is a same protocol as the second protocol.

5. The method of claim 1 wherein:

the second network comprises a first communications bus and a second communications bus;

the second protocol comprises a fourth protocol for communicating on the first bus and a fifth protocol for communicating on the second bus; and the step of issuing comprises the steps of issuing the first commands in the fourth protocol on the first bus of the second network, and issuing the second commands in the fifth protocol on the second bus of the second network.

6. The method of claim 2 wherein:

the steps of translating and encapsulating are performed by an interface of the second network to the third network which appears to the second network substantially as a port circuit of the second network; and the step of retrieving is performed by an interface of the first network to the third network which appears to the first network substantially as a port circuit of the first network.

7. The method of claim 6 whereby:

the first network functions as if it were connected directly to the second network without intermediacy of the third network.

8. The method of claim 1 wherein:

the steps of translating and encapsulating are performed by an interface of the second network to the third network which appears to the second network substantially as a port circuit of the second network.

9. The method of claim 2 whereby:

the steps of translating and encapsulating are performed by an interface of the second network to the third network;

the step of retrieving is performed by an interface of the first network to the third network; and the first network functions is if it were connected directly to the second network without intermediacy of the third network.

10. The method of claim 1 wherein:

the third protocol is an asynchronous transfer mode (ATM) protocol;

the step of translating the second commands comprises the step of translating the second commands into ATM signaling cells; and the step of encapsulating the first commands comprises the step of encapsulating the first commands as cell payloads in ATM traffic cells.

11. The method of claim 1 wherein:

the step of sending the translated second commands comprises the step of sending the translated second commands to the third network for effecting a virtual circuit connection for conveying communications traffic between the first and the second networks; and the step of sending the encapsulated first commands comprises the step of sending the encapsulated first commands from the second network as traffic through the virtual circuit connection.

12. An apparatus that performs the method of claim 1 or 4 or 5 or 8 or 10 or 11.

13. An apparatus for connecting a first communications network that uses a first communications protocol and controls a second communications network that uses a second communications protocol to a third communications network that interconnects the first network with the second network and uses a third communications protocol different from the first and the second protocols, comprising:

an effector, responsive to the first network issuing first commands in the first protocol for controlling the third network, of translating the first commands from the first protocol into the third protocol and sending the translated first commands to the third network for use in effecting a communications connection between the first and the second networks; and an effector, responsive to the first network issuing second commands in the first protocol for controlling the second network, of encapsulating the first commands in the third protocol and sending the encapsulated second commands through the connection to the second network for retrieval of the second commands from the encapsulation at the second network and use of the retrieved second commands in the second network to control the second network.

14. The apparatus of claim 13 wherein:

the effector of translating and sending sends the translated first commands to the third network for use in effecting a virtual circuit connection for conveying communications traffic between the first and the second networks; and the effector of encapsulating and sending sends the encapsulated second commands as traffic through the virtual circuit connection.

15. An apparatus for connecting a first communications network that uses a first communications protocol and controls a second communications network that uses a second communications protocol to a third communications network that interconnects the first network with the second network and uses a third communications protocol different from the first and the second protocols, comprising:

means responsive to the first network issuing first commands in the first protocol for controlling the third network, for translating the first commands from the first protocol into the third protocol and sending the translated first commands to the third network for use in effecting a communications connection between the first and the second networks; and means responsive to the first network issuing second commands in the first protocol for controlling the second network, for encapsulating the first commands in the third protocol and sending the encapsulated second commands through the connection to the second network for retrieval of the second commands from the encapsulation at the second network and use of the retrieved second commands in the second network to control the second network.

16. The apparatus of claim 15 whereby:

the second network is caused to function as if it were connected directly to the first network without intermediacy of the third network.

17. The apparatus of claim 15 wherein:

the first protocol is a same protocol as the second protocol.

18. The apparatus of claim 15 wherein:

the first network comprises a first communications bus and a second communications bus;

the first protocol comprises a fourth protocol for communicating on the first bus and a fifth protocol for communicating on the second bus;

the translating means is responsive to the first network issuing commands on the first bus; and the encapsulating means is responsive to the first network issuing commands on the second bus.

19. The apparatus of claim 15 wherein:

the translating means and the encapsulating means are comprised of an interface of the first network to the third network which appears to the first network substantially as a port circuit of the first network.

20. The apparatus of claim 15 wherein:

the third protocol is an asynchronous transfer mode (ATM) protocol;

the translating means translate the second commands into ATM signaling cells; and the encapsulating means encapsulate the first commands as cell payloads in ATM traffic cells.

21. The apparatus of claim 15 wherein:

the means for translating and sending send the translated first commands to the third network for use in effecting a virtual circuit connection for conveying communications traffic between the first and the second networks; and the means for encapsulating and sending sends the encapsulated second commands as traffic through the virtual circuit connection.

22. An apparatus for connecting a first communications network that uses a first communications protocol and is controlled by a second communications network that uses a second communications protocol to a third communications network that interconnects the first network with the second network and uses a third communications protocol different from the first and the second protocols, comprising:

an effector, responsive to the first network issuing first commands in the first protocol for controlling the third network, of translating the first commands from the first protocol into the third protocol and sending the translated first commands to the third network for use of the translated first commands by the third network to effect a communications connection between the first and the second networks through the third network; and an effector, responsive to receipt from the second network via the communications connection extending through the third network between the first network and the second network of second commands in the first or second protocol encapsulated in the third protocol, of retrieving the second commands from the encapsulation for use of the retrieved second commands by the first network to control the first network.

23. The apparatus of claim 22 wherein:

the third protocol is an asynchronous transfer mode (ATM) protocol;

the translating means translate the second commands into ATM signaling cells; and the encapsulating means encapsulate the first commands as cell payloads in ATM traffic cells.

24. The apparatus of claim 22 wherein:

the effector of translating and sending sends the translated first commands to the third network for use in effecting a virtual circuit connection for conveying communications traffic between the first and the second networks; and the effector of retrieving the second commands receives the encapsulated second commands as traffic through the virtual circuit connection.

25. An apparatus for connecting a first communications network that uses a first communications protocol and is controlled by a second communications network that uses a second communications protocol to a third communications network that interconnects the first network with the second network and uses a third communications protocol different from the first and the second protocols, comprising:

means responsive to the first network issuing first commands in the first protocol for controlling the third network, for translating the first commands from the first protocol into the third protocol and sending the translated first commands to the third network for use of the translated first commands by the third network to effect a communications connection between the first and the second networks through the third network; and means responsive to receipt from the second network via the communications connection extending through the third network between the first network and the second network of second commands in the first or second protocol encapsulated in the third protocol, for retrieving the second commands from the encapsulation for use of the retrieved second commands by the first network to control the first network.

26. The apparatus of claim 25 whereby:

the first network function as if it were connected directly to the second network without intermediacy of the third network.

27. The apparatus of claim 25 wherein:

the first protocol is a same protocol as the second protocol.

28. The apparatus of claim 25 wherein:

the first network comprises a first communications bus and a second communications bus;

the first protocol comprises a fourth protocol for communicating on the first bus and a fifth protocol for communicating on the second bus;

the translating means is responsive to the first network issuing commands in the fourth protocol on the first bus; and the retrieving means comprises means for transmitting the retrieved second commands on the second bus in the fifth protocol.

29. The apparatus of claim 25 wherein:

the translating means and the retrieving means are comprised of an interface of the first network to the third network which appears to the first network substantially as a port circuit of the first network.

30. The apparatus of claim 25 wherein:

the means for translating and sending send the translated first commands to the third network for use in effecting a virtual circuit connection for conveying communications traffic between the first and the second networks; and the means for retrieving the second commands receive the encapsulated second commands as traffic through the virtual circuit connection.

* * * * *